United States Patent
Yabuya et al.

[11] Patent Number: 6,105,917
[45] Date of Patent: Aug. 22, 2000

[54] CUP HOLDER

[75] Inventors: Shigeru Yabuya, Inuyama; Akiyoshi Nagano, Ama-gun; Junichiro Kako, Nakashima-gun; Akira Azumi, Kakamigahara; Tetsuya Tani, Nishio, all of Japan

[73] Assignee: Toyoda Gosei Co., Ltd., Nishikasugai-gun, Japan

[21] Appl. No.: 09/100,237

[22] Filed: Jun. 19, 1998

[30] Foreign Application Priority Data

Jun. 19, 1997 [JP] Japan ................... 9-180736

[51] Int. Cl.[7] ............... A47K 1/08; A47C 7/62; B60R 7/00; B28B 3/06; B29B 7/00

[52] U.S. Cl. ................... 248/311.2; 297/188.17; 224/281; 224/926; 264/297.2; 264/328.8

[58] Field of Search ................. 248/311.2, 310; 297/188.16, 188.07, 188.19, 188.14, 188.15, 188.17, 188.18; 224/281, 926, 282; 264/297.1, 297.2, 250, 255, 328.8

[56] References Cited

U.S. PATENT DOCUMENTS

| | | | |
|---|---|---|---|
| 4,155,972 | 5/1979 | Hauser et al. | 264/250 |
| 4,442,055 | 4/1984 | Oelsch et al. | 264/105 |
| 4,670,199 | 6/1987 | Montet et al. | 264/1.9 |
| 4,784,814 | 11/1988 | Diethelm et al. | 264/102 |
| 4,826,058 | 5/1989 | Nakayama | 248/311.2 |
| 4,863,665 | 9/1989 | Schad et al. | 264/255 |
| 4,931,234 | 6/1990 | Schad et al. | 264/40.1 |
| 4,944,909 | 7/1990 | Eckhardt et al. | 264/255 |
| 4,953,771 | 9/1990 | Fischer et al. | 248/311.2 |
| 5,049,341 | 9/1991 | Rubenstein | 264/242 |
| 5,153,052 | 10/1992 | Tanaka et al. | 428/212 |
| 5,259,579 | 11/1993 | Schneider | 248/311.2 |
| 5,354,532 | 10/1994 | Nakai et al. | 264/259 |
| 5,427,447 | 6/1995 | Satoh | 312/309 |
| 5,505,417 | 4/1996 | Plocher | 248/311.2 |
| 5,595,799 | 1/1997 | Beck et al. | 428/35.7 |
| 5,656,307 | 8/1997 | Naitio et al. | 425/572 |
| 5,673,891 | 10/1997 | Fujihara et al. | 248/311.2 |
| 5,692,658 | 12/1997 | Fischer et al. | 248/311.2 |
| 5,692,718 | 12/1997 | Bieck | 248/311.2 |
| 5,789,033 | 8/1998 | Bertschi et al. | 425/572 |
| 5,804,121 | 9/1998 | Gallagher | 264/250 |

*Primary Examiner*—Leslie A. Braun
*Assistant Examiner*—Michael Nornberg
*Attorney, Agent, or Firm*—Pillsbury Madison & Sutro Intellectual Property Group

[57] ABSTRACT

A cup holder is arranged for withdrawal from and insertion into an accommodation case. The cup holder includes a frame plate, a cup inserting hole formed through the frame plate, and a cup receiving frame pivotally arranged on the frame plate for rotation, and receiving a cup at a location underneath the cup insertion hole. One of the frame plate and the cup capable of receiving frame is formed of a resin with a higher melting point and the other is formed of a lower melting point resin with a melting point lower than the higher melting point resin. The frame plate and the cup receiving frame are formed by a two-layer molding method wherein the higher melting point resin is cast by injection molding and then a lower melting point resin is cast by injection molding.

6 Claims, 5 Drawing Sheets

CUP HOLDER

BACKGROUND OF THE INVENTION

1. Field of the Invention

This invention relates to a cup holder which is provided, for being pulled out and pushed in, at a front portion or the like in a vehicular compartment.

2. Description of the Related Art

There is provided a cup holder 91 to stably hold a cup, coffee can, etc. in a vehicular compartment, as shown in FIG. 6 and FIG. 7. The cup holder 91, for example, is provided for being pulled out of and pushed into an accommodation case 92 built at the underneath an audio box 86 at the front of the vehicular compartment.

The cup holder 91 has a frame plate 912, a cup insertion hole 910 formed through the frame plate 912, and a cup receiving frame 95 pivotally arranged for rotation on the frame plate 912 to receive a cup 8 at the underneath the cup insertion hole 910.

The cup receiving frame 95 is pivotally arranged, at its base portion 953, on an axial pin 913 provided on the frame plate 912. The cup receiving frame 95 also has, at its lower end, a receiving portion 952 for receiving the up 8.

To put a cup on the cup holder 91, the cup holder 91 is pulled out toward a front of the accommodation case 92, as shown in FIGS. 6 and 7. Then, the cup 8 may be inserted in the cup insertion hole 910 and its bottom rested on the receiving portion 952 of the cup holder.

When accommodating the cup holder 91, the cup is taken out and the cup holder 91 is pushed into the accommodation case 92. At this time, the receiving frame pivotally provided on the frame plate 912 is raised while being held by a bottom face of the accommodation case 92, and accommodated within a thickness of the frame plate 912 (see FIG. 1 stated later).

Incidentally, reference numeral 81 in FIG. 6 is an air-conditioner operating panel.

The cup holder 91 is formed of a metal or a hard synthetic resin.

Also, the cup receiving frame 95 is made separately from the frame plate 912. The cup receiving frame 95 is pivotally mounted, by rotatably fitting a pin hole in the base 953 thereof on the axial pin 913 of the frame plate 912.

The conventional cup holder, however, requires dimensional accuracy between parts, because the parts are assembled together as stated above. Further, this requires an assembling process, resulting in reduced producibility.

Further, if the parts have poor dimensional accuracy of assembling, the parts have chatter, resulting in chatter sound generation upon withdrawing and accommodating the cup holder.

SUMMARY OF THE INVENTION

It is an object of the present invention to provide a cup holder which is free from chatter sound generation and excellent in producibility without requiring assembling operation.

The present invention is a cup holder arranged for withdrawal from and insertion into a case, comprising: a frame plate; a cup inserting hole formed through the frame plate; a cup receiving frame pivotally arranged on the 15 frame plate for rotation, and capable of receiving a cup at a location underneath the cup insertion hole. Each of the frame plate and the cup receiving frame comprises a resin, one of the resins of the frame plate and the cup receiving frame is higher than a melting point of the other. The frame plate and the cup receiving frame are formed separately so that a higher melting point resin is injected into a first cavity formed in a mold so as to cast one of the frame plate and the cup receiving frame and then a lower melting point resin is injected into a second cavity formed in the mold so as to cast the other of the frame plate and the cup receiving frame.

It should be noted that the frame plate and the cup receiving frame are both formed of respective resins, wherein one of the resins is a higher melting point resin and the other is a lower melting point resin. The frame plate and the cup receiving frame are manufactured by a multi-layer molding technique with injection molding.

In the present invention, the higher melting point resin includes, for example, resins such as of ABS, polyamide, polyacetal, PET and PBT. On the other hand, the lower melting point resin includes, for example, polypropylene, polyethylene and polystyrene.

However, the combination of these resins is shown as one example. For example, among the above resins as listed as a higher melting point resin, the resin relatively at higher melting point and lower melting point may be used as a higher melting point resin or a lower melting point resin.

Also, the multi-layer molding technique is disclosed, for example, in Japanese Patent Publication No. Sho. 59-119227.

The operational effects of the present invention will now be explained.

That is, in the cup holder of the present invention, one of the frame plate and the cup receiving frame is made of a higher melting point resin and the other is made of a lower melting point resin. Accordingly, where making a cup holder by a multi-layer molding using a higher melting point resin for the frame plate and a lower melting point resin for the cup receiving frame, the higher melting point resin is first injection molded to form a frame plate.

Then, a lower melting point resin is injection molded using a mold for forming a cup receiving frame with the frame plate left within the mold, thereby forming a cup receiving frame.

Accordingly, the cup receiving frame can be formed, in the same mold, to be rotatable on the frame plate.

Therefore, the frame plate and the cup receiving frame do not have to be formed separately and then assembled together. Thus, the frame plate and the cup receiving frame do not require dimensional accuracy for assembling. Therefore, assembling operation is not necessary and producibility is excellent.

Also, since these parts are divided by the higher melting point resin and the lower melting point resin, the parts are not joined with each other. The pivotal portion (rotational portion) between these parts is formed with a slight gap. This prevents chatter sound from occurring when the cup holder is pulled out of and push into the accommodation case.

In the above pivotal fit, one of the parts has is an axial pin and the other part has an axial bore. Provided that an axial pin side is formed by a higher melting point resin, the multi-layer molding is carried out by first forming an axial pin side (e.g. frame plate) with a higher melting point resin and then forming a part having axial bore (e.g. cup receiving frame). Of course, it is allowed to form the axial pin side with the higher melting point resin and then form the part having the axial bore with the lower melting point resin.

In this case, these parts are different in melting point, and there is no fusion between the axial pin and the axial bore wall. After completing the multi-layer molding, when the molded parts are taken out of the mold and allowed to cool, the axial pin somewhat shrinks. On the other hand, the resin on the axial bore side also shrinks to be somewhat increased in axial bore size. This, therefore, provides a slight gap (0.2–0.5 mm) between the axial pin and the axial bore. Thus, an appropriate rotatable state is given to the pivotal portion.

Therefore, the pivotal portion has no chatter. There is no generation of chatter sound when the cup holder is withdraw from and inserted into the accommodation case.

In this manner, the present invention provides a cup holder which is free from chatter sound generation and excellent in producibility without assembling processes.

The frame plate may be pivotally arranged with a cup holding piece for rotation to hold a side surface of the cup toward an end of the cup inserting hole, and the cup holding piece may be formed of a same material as that of the cup receiving frame.

In this case, the cup holding piece can also be pivotally arranged on the frame plate for rotation without requiring an assembling process, similarly to the cup receiving frame. Thus, there is no chatter sound generation and producibility is excellent.

The frame plate may be formed of the higher melting point resin.

In this case, due to the multi-layer molding, the frame plate is first formed of the higher melting point resin and then the cup receiving frame and the cup holding piece are formed of the lower melting point resin. Therefore, there is advantage that no step occurs the steps of forming between the frame plate and the receiving frame, enabling these parts to be formed on a common plane.

The frame plate may be formed of the lower melting point resin. In this case, due to the multi-layer molding, the cup receiving frame and the cup holding piece are first formed of the higher melting point resin, and then the frame plate is formed of the lower melting point resin. This provides an advantage that the mold can be rendered simple in structure.

DETAILED DESCRIPTION OF THE PREFERRED EMBODIMENTS

A cup holder according to an embodiment of the present invention will now be explained with reference to FIGS. 1 to 5.

Figure 1:
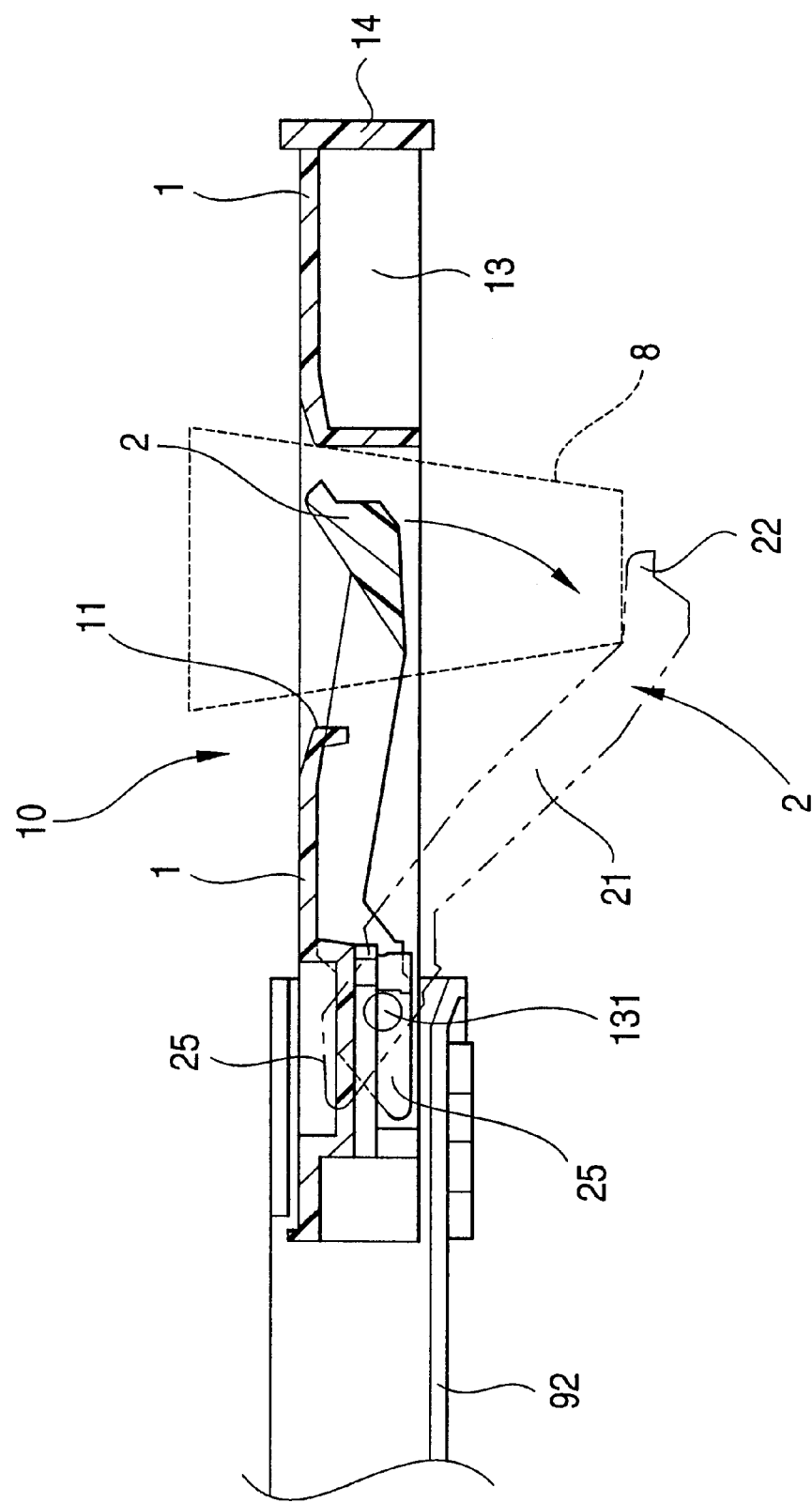
FIG. 1 is a side explanatory view of a cup holder according to an embodiment.
Figure 2:
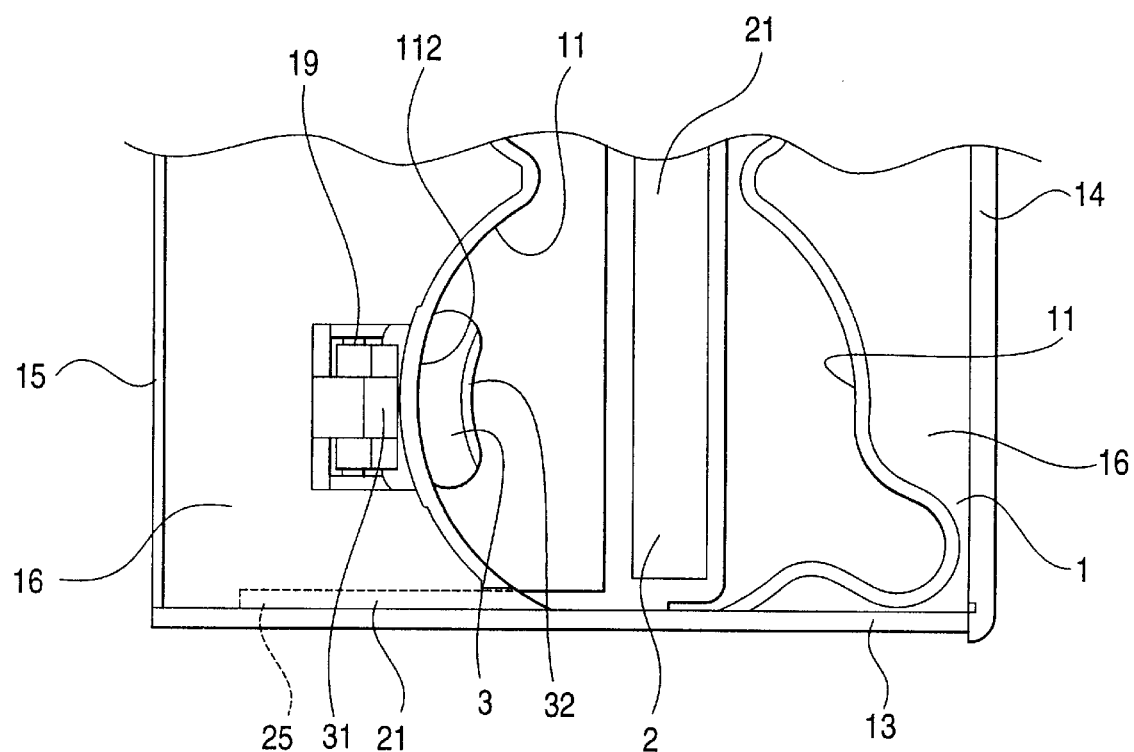
FIG. 2 is a essential part plan view of the embodied cup holder.
Figure 3:
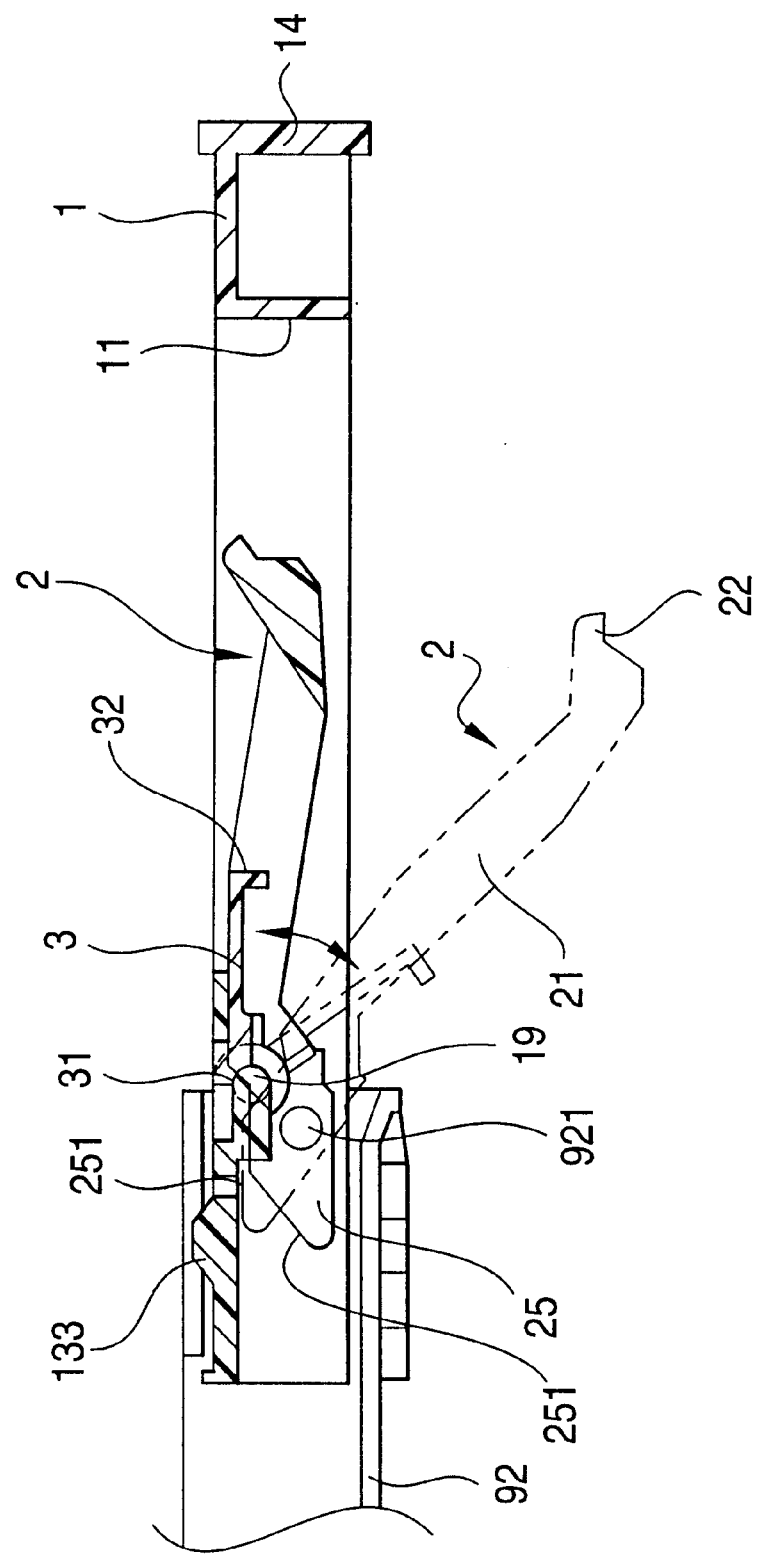
FIG. 3 is an explanatory view showing a relationship between a cup receiving frame and a cup holding piece of the embodied cup holder.
Figure 4:
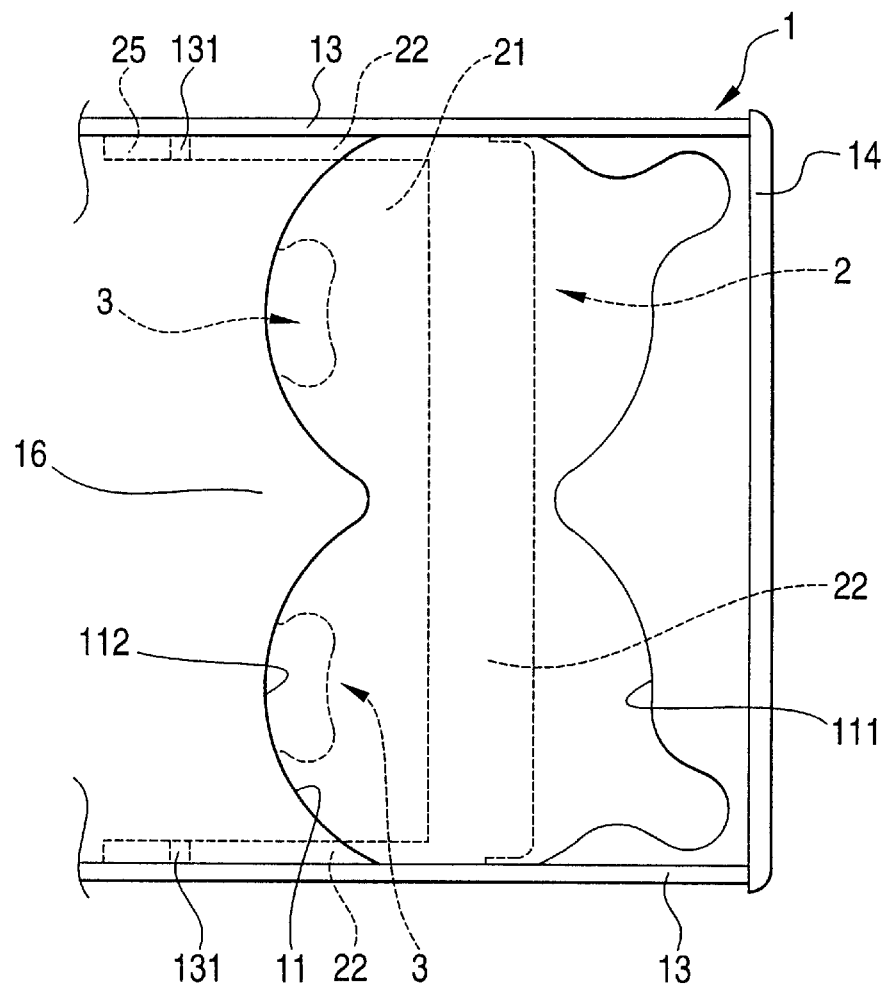
FIG. 4 is an explanatory view of a frame plate of the embodied cup holder.

Referring to FIGS. 1 to 3, a cup holder 10 of this embodiment is arranged for withdrawal from and accommodation in the accommodation case 92.

The cup holder 10 comprises a frame plate 1, cup insertion hole 11 formed through the frame plate 1, and a cup receiving frame 2 pivotally arranged on the frame plate 1 for rotation to receive a cup 8 at the underneath of the cup insertion hole 11. Also, a cup holding piece 3 is provided projecting toward the cup insertion hole 11.

The frame plate 1 is formed by a resin with a higher melting point, while the cup receiving frame 2 and the cup holding piece 3 are formed by a resin with a lower melting point.

These are formed by a two-layer molding technique which is one of the multi-layer molding techinique that performs injection-molding with a higher melting point resin and then injection-molding with a lower melting point resin.

The frame plate 1 has, as shown in FIGS. 1 to 4, side frame portions 13 provided at respective left and right, a front frame 14 and a rear frame 15, and a plate portion 16 encompassed by these portions. The plate portion 16 is formed with cup insertion holes 11 for two cups for inserting cups therethrough.

The frame plate 1 is pivotally mounted with the cup receiving frame 2 for rotation, as shown in FIGS. 1 to 4. That is, the cup receiving frame 2 has left and right frames 21 and a receiving portion 22 provided between tip portions of them. The frames 21 respectively have base portions 25 rotatably pivoted on an axial pin 131 provided on the side frame portions 13 of the frame plate 1 (FIGS. 1 and 3).

The base portions 25 have an abutting portion 251 to be abutted against an upper stop piece 133 on the side frames 13 when a cup 8 is rested on the cup receiving frame 2 (shown by two dot-chain lines in FIGS. 1 and 3).

The frame plate 1 is pivotally arranged with a cup holding piece 3 for rotation, as shown in FIGS. 1 to 3 and 5, so that it projects forward of a rear wall 112 of the cup insertion hole 11.

Figure 5:
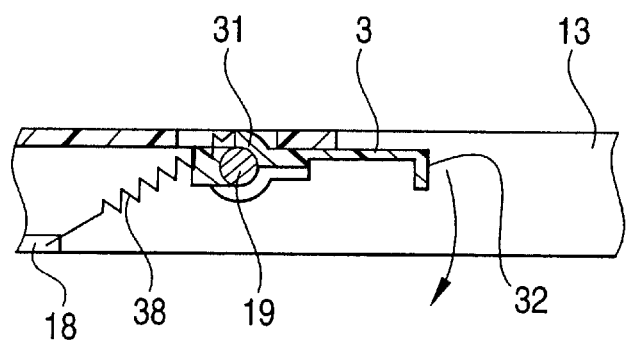
FIG. 5 is an explanatory view of the holding piece of the embodied cup holder.
Figure 6:
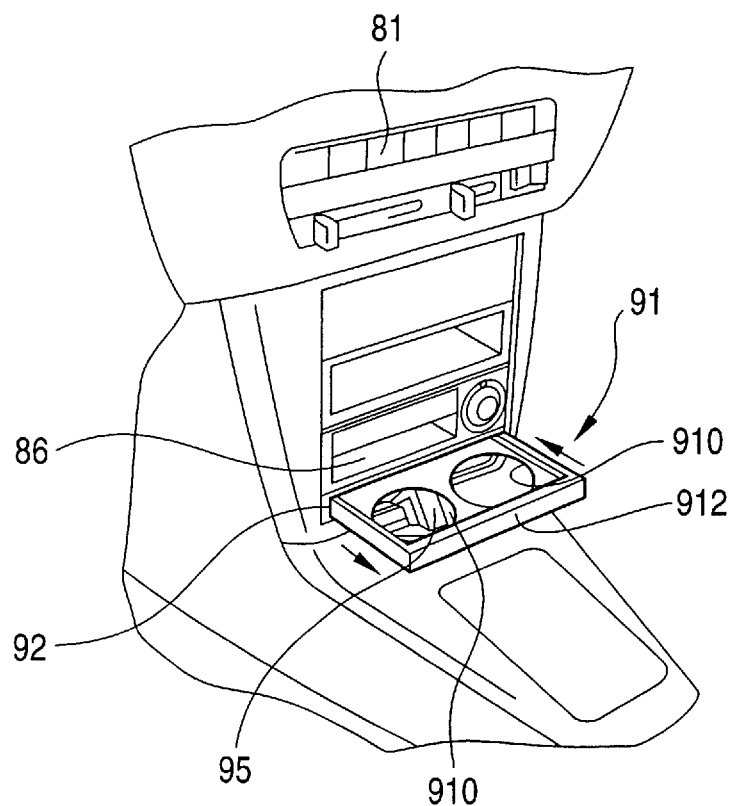
FIG. 6 is a perspective view of a cup holder mounting portion in a conventional example.
Figure 7:
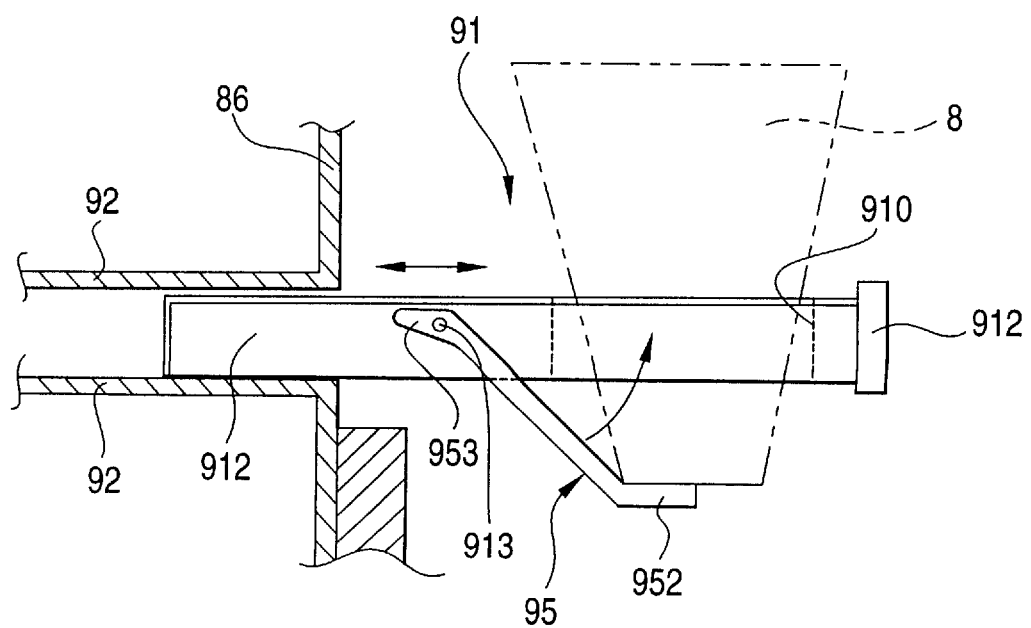
FIG. 7 is an operational explanatory view of the cup holder in the conventional example.

The cup holding piece 3 has, at its front, a front face 32 to hold against a side face of the cup 8. A base portion 31 is pivotally arranged on axial pins 19 formed of a higher melting point resin together with the frame plate 1. Further, a spring 38 is provided between the ase portion 31 and a spring attaching portion 18 so that he cup holding piece 3 is always urged toward the cup insertion hole 11 (FIG. 5).

In the present embodiment, the cup holder is made by a two-layer molding technique wherein the frame plate 1 is formed of an ABS resin as a higher melting point resin, while the cup receiving frame 2 and the cup holding piece 3 are of a polypropylene resin as a lower melting point resin.

When performing the two-layer molding, a frame-plate forming cavity is first provided by using a core mold and a frame plate mold, into which a higher melting point resin is cast by injection molding technique.

After the higher melting resin is set, the frame plate mold is separated from the core mold and then a core mold is rotated with a formed frame plate 1 fixed.

Then, a cavity for forming a cup receiving frame and a cup holding piece is provided by the core mold with the frame plate 1 formed therein and a mold for forming a cup receiving frame and a cup holding piece. Then, a lower melting point resin is cast into the cavity by injection molding. Due to this, a cup holder is formed by the two-layer molding.

The operational effects by this embodiment will now be explained.

According to this embodiment, the cup receiving frame can be rotatably formed on the frame plate 1 in a one-body form.

This eliminates the need for the frame plate 1 and the cup receiving frame 2 (and the cup holding piece 3) to be made separately and thereafter assembled together. Also, the dimensional accuracy for assembling the frame plate 1 and the cup receiving is not required. Therefore, assembling operation is not necessary and producibility is excellent.

Since the two parts are separated by the higher melting point resin and the lower melting point resin, the pivotal portion (rotatable portion) between the parts are formed with a slight gap without being joined. This prevents chatter sound from occurring upon withdrawing and accommodating the cup holder 10.

That is, the pivotal mount is provided by first forming an axial pin side with the high meting resin and then forming the cup receiving frame 2 and the cup holding piece 3.

At this time, since these two resins are different in melting point, there is no fusion between the axial pins 131, 19 and their axial bore walls. After completing the two-layer molding, when the molded assembly are taken out of the mold and allowed to be cooled, the axial pins 131, 19 somewhat shrink. On the other hand, there is also shrinkage in the cup receiving frame 2 and cup holding piece 3, somewhat increasing the axial bore size. Accordingly, a slight gap (0.2–0.5 mm) is form between the axial pin and the axial bore. Thus, an adequate rotatable state is provided to the pivotal potion.

Therefore, the cup holder 10 is free from chatter at the pivotal portions so that no chatter sound is generated when the cup holder 10 is pulled out of and inserted into the accommodation case 92.

According to the present invention, a cup holder is provided with high producibility that is free from chatter sound generation without requiring assembling operation.

What is claimed is:

1. A cup holder arranged for withdrawal from and insertion into a vehicular compartment, said cup holder comprising:

a frame plate having at least one cup inserting hole into which a cup is insertable;

at least one cup receiving frame pivotally arranged on said frame plate and constructed and arranged to receive a bottom portion of the cup, said cup receiving frame being pivotal about a pin and a bore containing said pin; and a biasing member applying a sufficient biasing force to said cup receiving frame to urge said cup receiving frame upward when the cup is not received in said cup insertion hole, yet the biasing force not preventing said cup receiving frame from pivoting downward in response to a load supplied by the cup, wherein each of said frame plate and said cup receiving frame comprises a respective resin, one of said resins of said frame plate and said cup receiving frame being a higher melting point resin and the other of said resins being a lower melting point resin having a lower melting point that said higher melting point resin, and wherein said axial pin is formed on one of said frame plate and said cup receiving frame and said bore is formed in the other of said frame plate and said cup receiving frame, said pin being arranged in said bore to define a gap between an outer surface of said pin and a wall-defining surface of axial bore in a range of from 0.2 mm to 0.5 mm.

2. The cup holder according to claim 1, further comprising a cup hold piece pivotally arranged on an end of said cup inserting hole so as to hold a side surface of the cup when the cup is inserted therein, said cup holding piece comprising the same resin material as that of said cup receiving member.

3. The cup holder according to claim 1, wherein said frame plate comprises the higher melting point resin.

4. The cup holder according to claim 2, wherein said frame plate comprises the higher melting point resin.

5. The cup holder according to claim 1, wherein said frame plate comprises the lower melting point resin.

6. The cup holder according to claim 2, wherein said frame plate comprises the lower melting point resin.

* * * * *